United States Patent [19]

Suzuki et al.

[11] Patent Number: 4,514,719
[45] Date of Patent: Apr. 30, 1985

[54] DATA TRANSMISSION SYSTEM UTILIZING POWER LINE OF 3-PHASE ALTERNATING CURRENT

[75] Inventors: Yoshiharu Suzuki; Hitoshi Fukagawa, both of Kadoma; Yoshiyuki Komoda, Osaka; Osamu Tanaka, Kadoma, all of Japan

[73] Assignee: Matsushita Electric Works, Ltd., Kadoma, Japan

[21] Appl. No.: 429,961

[22] Filed: Sep. 30, 1982

[30] Foreign Application Priority Data

Oct. 15, 1981 [JP] Japan ................................ 56-164973

[51] Int. Cl.³ ......................................... H04M 11/04
[52] U.S. Cl. ................................ 340/310 R; 370/100; 375/111
[58] Field of Search .......... 340/310 R, 310 A, 825.14; 370/100; 375/111, 118, 119; 307/269; 328/63

[56] References Cited

U.S. PATENT DOCUMENTS

| | | | |
|---|---|---|---|
| 2,612,601 | 9/1952 | Musselman | 340/825.14 |
| 2,860,324 | 11/1958 | Berger | 340/310 R |
| 4,097,692 | 6/1978 | Felix | 340/310 R |
| 4,359,770 | 11/1982 | Suzuka | 370/100 |
| 4,398,178 | 8/1983 | Russ | 340/310 A |
| 4,400,688 | 8/1983 | Johnston | 340/310 R |
| 4,408,333 | 10/1983 | Fujii | 375/111 |

Primary Examiner—James J. Groody
Assistant Examiner—Michael F. Heim
Attorney, Agent, or Firm—Staas & Halsey

[57] ABSTRACT

A transmitter connected to any phase of a 3-phase alternating current transmits a data subsequent to a lock signal in synchronism with the cycles of the phase. A receiver connected to any phase of the 3-phase alternating current receives a lock signal in synchronism with the cycles of the phase. The receiver receives each data after the receiver is synchronized with the transmitter using the lock signal. The synchronized relation is maintained, that is locked until each data transmission subsequent to a lock signal is terminated. The lock is released upon detection of an end signal added to the last portion of each data or a non-busy signal interval. In the case wherein a data transmission is repeated a plurality of times, a set of signals including a lock signal and a data is repeatedly sent out, interleaved with a non-busy signal interval.

10 Claims, 17 Drawing Figures

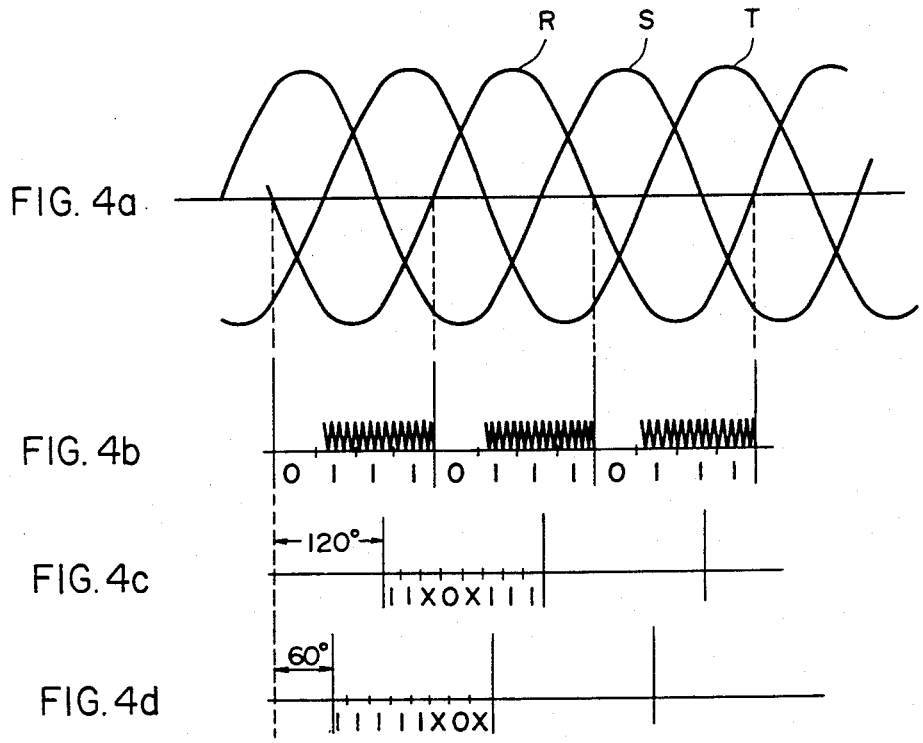
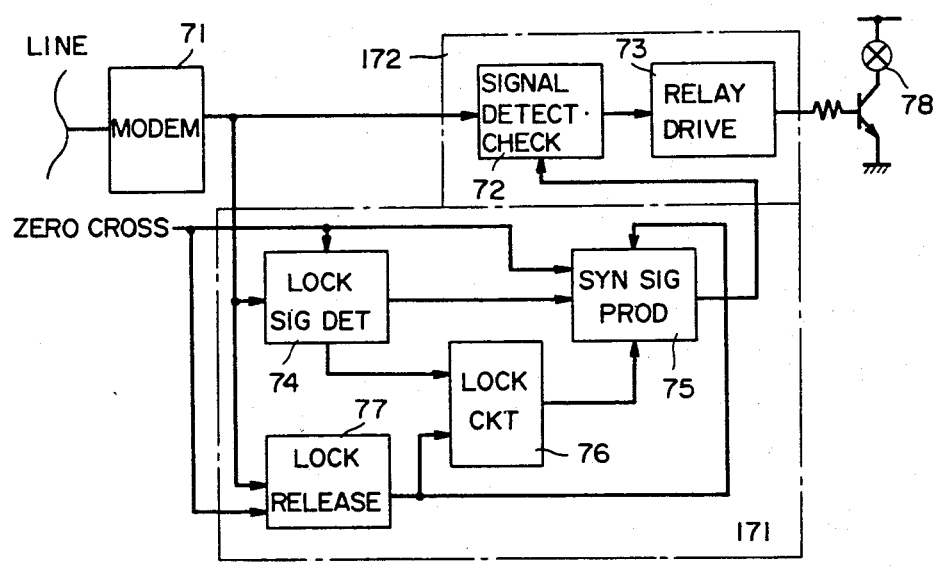

DATA TRANSMISSION SYSTEM UTILIZING POWER LINE OF 3-PHASE ALTERNATING CURRENT

BACKGROUND OF THE INVENTION

The present invention relates to a data transmission system utilizing a power line of a 3-phase alternating current. More specifically, the present invention relates to a data transmission system utilizing a power line of a 3-phase alternating current for transmission of data in synchronism with the cycles of alternating current of a power supply.

A system for transmission of data utilizing a power line of a single-phase alternating current has been conventionally proposed and put into practical use. In addition, such a data transmission system is extended to a system utilizing a power line of a 3-phase alternating current. For example, the system for controlling various indoor electric appliances by superposing a high frequency carrier as controlled data on an alternating current wave of a power supply by the use of an indoor power supply line has been put into practical use. In general, the transmission of data is performed in synchronism with the cycles of the alternating current of a power supply. More particularly, referring to FIG. 1, using as the reference a phase of an alternating current the zero voltage crossing (zero-cross point), the spacing between two zero-cross points is divided into four sections. The data is determined by a combination of carriers existing in these four sections. For example, the first spacing between zero-cross points in FIG. 1 indicates a start signal, the second and fourth spacings between zero-cross points indicates a data of "1" and the third spacing between zero-cross points indicates a data of "0". The control of a load can be achieved using the data for controlling the load, the data being structured by a plurality of these data of "1" and "0".

In the data transmission system extended to a system utilizing a power line of a 3-phase alternating current power, there exists a problem of synchronism between a transmitter and a receiver. More particularly, since the position of the zero-cross point is different for each phase R, S, T, of to FIG. 4, the data transmission cannot be made between the transmitter and the receiver which are connected to different phases, using as a reference the respective zero-cross point. For example, the data transmitted in synchronism with the zero-cross point of the R phase will be received as different data if the receiving of such data is synchronized with the zero-cross points of the S phase or the T phase. Accordingly, it becomes necessary to provide a synchronization of signals between a transmitter and a receiver in a data transmission system using a power line of a 3-phase alternating current. The prior art typically provides a synchronization of a signal between a transmitter and a receiver in a data transmission utilizing a power line of a 3-phase alternating current a disclosed in U.S. patent application Ser. No. 200,079, filed Oct. 24, 1980 by Yoshiharu Suzuki et al, assigned to the same assignee, Matsushita Electric Works, Ltd. In this prior art, prior to transmission of a control signal, a synchronization signal, one that is necessary for providing a synchronization of a signal between the transmitter and the receiver, is sent out. The synchronization signal is sent out in a particular predetermined code. On the receiver side, a synchronization of a signal to the transmitter side is achieved by receiving the synchronization signal with reference to the zero-cross point of its own receiver and detecting a shift of the phase with respect to the transmitter side based on the variation of the above described code of the received signal. However, in this prior art, the synchronization between the transmitter and the receiver set by a detection of the synchronization signal cannot be necessarily maintained until the subsequent control signal is completely received. This is because a synchronization circuit in the prior art is always in an enable state and thus, if the same code is a synchronization signal changed due to an influence of noise or the like which happens to exist in a control signal subsequent to the synchronization signal, the synchronization circuit is necessarily responsive to such signals. Accordingly, in such a case, a synchronized relation between a transmitter and a receiver can be released in the course of the data transmission. In such a case, the data transmission will be a failure.

Therefore, it is desired to provide a data transmission system utilizing a power line of a 3-phase alternating current in which, once a synchronization of signal between a transmitter and a receiver is set in response to a detection of a synchronization signal, the synchronized relation can be maintained until the data transmission is terminated. As one approach for structuring such a data transmission system, it may be considered that a signal for disabling a synchronization circuit is provided immediately after a synchronization signal, or a signal for enabling again the synchronization circuit is provided after a data transmission. However, such approach makes a transmitter and a receiver complicated, which is not economical.

SUMMARY OF THE INVENTION

The present invention is directed to a data transmission system utilizing a power line of a 3-phase alternating current coupled to a 3-phase alternating current power supply for sending data in synchronism with the cycles of the alternating current of the power supply. A plurality of transmitters and a plurality of receivers are connected to a power line of a 3-phase alternating current power supply. Each of the transmitters continuously sends data after it sends out a lock signal in a predetermined format, for providing synchronization of a signal between transmitter and a respective receiver in synchronism with the cycles of the respective phase to which the transmitter is connected. Each of the receivers detects the lock signal in synchronism with the cycles of the respective phase to which the receiver is connected and provides a respective synchronization of the signal between the receiver and the respective transmitter, corresponding to a variation to which the lock signal is subject. In each of the receivers, after synchronization, the synchronized relation is maintained, that is, it is locked, until the data transmission is terminated.

In a preferred embodiment of the present invention, a receiver is locked in response to a detection of a lock signal, and the lock is released in response to a detection of a period for a non-busy signal after the data transmission is terminated. In the preferred embodiment of the present invention, it is not necessary to add any separate signal for locking and releasing the lock.

Furthermore, in another preferred embodiment of the present invention, transmission of a lock signal and the data subsequent thereto is repeated a plurality of times. This repetition is interleaved with a non-busy signal period. Accordingly, the locking and releasing of the lock occur each time, and thus reliability can be enhanced.

Accordingly, a principal object of the present invention is to prevent a synchronized relation between a transmitter and a receiver from being changed in the course of a data transmission in a data transmission system utilizing a power line of a 3-phase alternating current power supply.

Another object of the present invention is to provide a data transmission system utilizing a power line of a 3-phase alternating current power supply in which the data transmission is repeated a plurality of times, wherein, each repeated time, a synchronization between a transmitter and a receiver can be achieved so that reliability is enhanced.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4D are graphs respectively showing the waveforms of a 3-phase alternating current and one example of lock signals superimposed on the three phases, for explaining how to achieve a synchronization of a signal between a transmitter and a receiver using the lock signal;

FIG. 7 is a schematic block diagram showing a preferred embodiment of the receiver in accordance with the present invention;

DETAILED DESCRIPTION OF THE PREFERRED EMBODIMENTS

Figure 1:
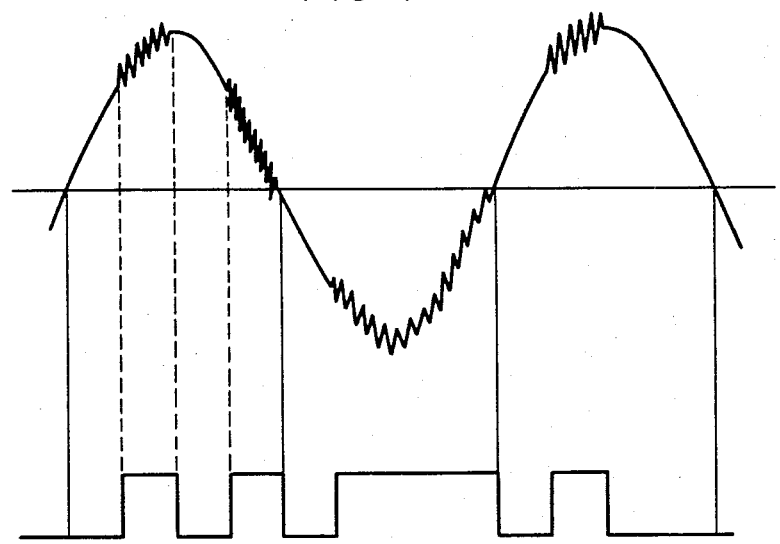
FIG. 1 is a graph showing waveforms of various signals for explaining the conventional concept of a data transmission utilizing a power line.
Figure 2:
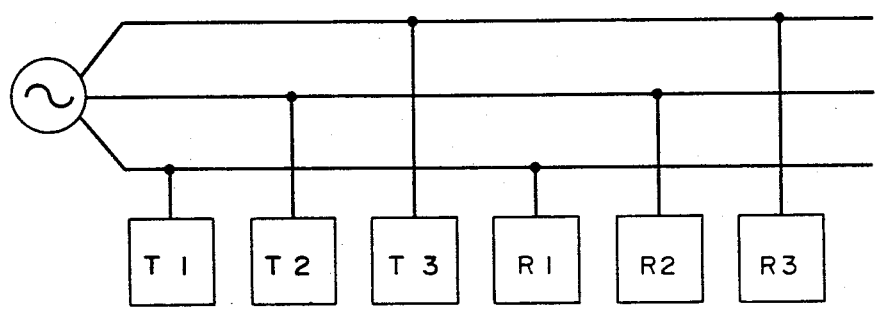
FIG. 2 is a schematic diagram indicating the signal transmission system of the present invention utilizing a power line of a 3-phase alternating current power supply.

FIG. 2 is a block diagram showing an outline of the data transmission system of the present invention utilizing a power line of a 3-phase alternating current power supply. A plurality of transmitters T1, T2, . . . , Tn and a plurality of receivers R1, R2, . . . , Rn are connected to any phase of a power line of a 3-phase alternating current power supply, respectively. The data transmission can be made between any transmitter and any receiver.

Figure 3:
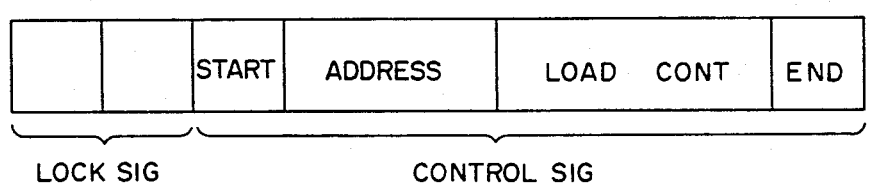
FIG. 3 shows a preferred example of a format of a signal for use in the data transmission system of the present invention.

FIG. 3 shows one example of a signal format for use in such data transmission. As shown in FIG. 3, a lock signal for synchronization of a signal between a transmitter and a receiver is sent out prior to sending a control signal comprising a start signal, an address signal, a load controlling signal and an end signal. The start signal is a signal for indicating the start of the control signal and the end signal is a signal for indicating the end of the control signal. In addition, the address signal is a signal for identifying a receiver to which the control signal is directed and the load controlling signal is a signal for indicating a manner of controlling a load, for example, for turning ON and OFF a power supply and the like. Such a control signal or signals are shown in detail in the above-described U.S. patent application, which is incorporated herein by reference.

Turning to FIG. 2 again, the operation of a transmitter and a receiver in accordance with the present invention will be schematically described. A signal sent from any one of the transmitters in a format shown in FIG. 3 is received in all of the receivers. Each of the receivers first detects a lock signal which is contained in the signal sent from the transmitter and disposed in the top portion, that is, in the beginning, of the signal, and makes a synchronization of the signal between the receiver and the transmitter which is sending the signal. One example of the synchronization will be described in conjunction with FIGS. 4A to 4D. In each of the receivers, after a synchronization with the transmitter which is sending a lock signal is achieved in response to the detection of the lock signal, the synchronized relation is adapted to be unchanged or locked until the reception of the subsequent series of signals is terminated. Once a synchronization is made, each of the receivers determines a control signal subsequent to the lock signal and if it is determined through an address signal contained in the control signal that the signal is directed to the receiver itself, then a manner of control indicated by a load controlling signal contained in the control signal is achieved for the load. The lock is released in response to detection of a predetermined period for a non-busy signal after termination of a series of signals. Accordingly, if a new series of signals are subsequently sent again, the receiver detects a new lock signal and makes another synchronization with the transmitter which is sending the new signals in response to detection of the new lock signal.

Referring to FIGS. 4A to 4D, there are shown a preferred example of a lock signal and a manner of making a synchronization of a signal between a transmitter and a receiver using the lock signal. A preferred example of a lock signal to be sent superimposed on an R phase, for example, of the 3-phase alternating current shown in FIG. 4A is shown in FIG. 4B. The lock signal as shown has four sections into which the spacing between two zero-cross points are divided, the first section being "0" (no carrier) and the second to the fourth sections being "1" (carriers), resulting in a signal format of "0111". The lock signal is received on the receiver side in which the zero-cross points in the receiver are used as a reference. In order to precisely detect the lock signal, a system of eight sections is used in a receiver. Accordingly, the lock signal is received in one of the following three manners corresponding to the phase to which the receiver is connected. First, in an R phase, it can be easily understood that the format of the received signal is "00111111" since the lock signal is sent from the R phase. Next, in an S phase, the format of the received signal is "11X0X111" since the position of the zero-cross point leads the R phase by 120 degrees as shown in FIG. 4A. The mark "X" indicates an undeterminable section in which a partial carrier exists. Thirdly, in a T phase, the manner of the received signal is "11111X0X" since the position of the zero-cross point leads the R phase by 60 degrees. In such a way, the phase shift between the zero-cross point in the transmitter and the zero-cross point in the receiver can be detected by detecting in which manner the lock signal is received. Accordingly, the zero-cross signal in the receiver is delayed to correct the phase shift. The delayed signal is used as a synchronization signal for receiving the control signal subsequent to the lock signal. Thus, synchronization of a signal between a transmitter and a receiver can be achieved.

In such an approach, in principle it is necessary to take at least two intervals from one zero-cross point to next zero-cross point, as a lock signal period, since the position in which a signal is detected is shifted. For example, the first and the second zero-cross intervals shown in FIG. 4A could be employed. There is described subsequently, an approach of making a first synchronization of a signal between a transmitter and a receiver, for the case wherein the same lock signals are continuously detected twice, so that three or more zero-cross intervals are needed, for instance the first, second and third zero-cross intervals in FIG. 4A. The lock signal of "0111" format as described in the foregoing is indicated by way of an example, and it should be understood that any lock signal can be applied except for a signal of all "0"s or all "1"s in the zero-cross interval. In essence, the lock signal is detected in a different manner depending on the shift of the detected position.

Figure 5:
FIG. 5 shows a preferred embodiment of a signal format for the case wherein a data transmission is repeated a plurality of times.

Turning to FIG. 5, there is shown a preferred example of a signal format for the case wherein a data transmission is repeated a plurality of times (in this example, two times). The format of the respective series of signals is the same as that shown in FIG. 3. Particularly, it is noted that a non-busy signal period is provided between two series of signals. The purpose of providing the non-busy signal period is to release a lock. Hence, for the purpose of speedup of the data transmission, a shorter non-busy period is preferred provided that the period is sufficient to release the lock. A detailed description of this is now provided. In the data transmission which is repeated a plurality of times, the detection of the lock signal and the synchronization between a transmitter and a receiver in response to the detection of the lock signal occur each time. Accordingly, even if the correct synchronized relation is not established due to the fact that the first lock signal is changed by the influence of noise or the like, the synchronization is again made by the subsequent second and third lock signals (if the data transmission is repeated three times). Therefore, as compared with a single data transmission, the reliability can be enhanced.

Figure 6A:
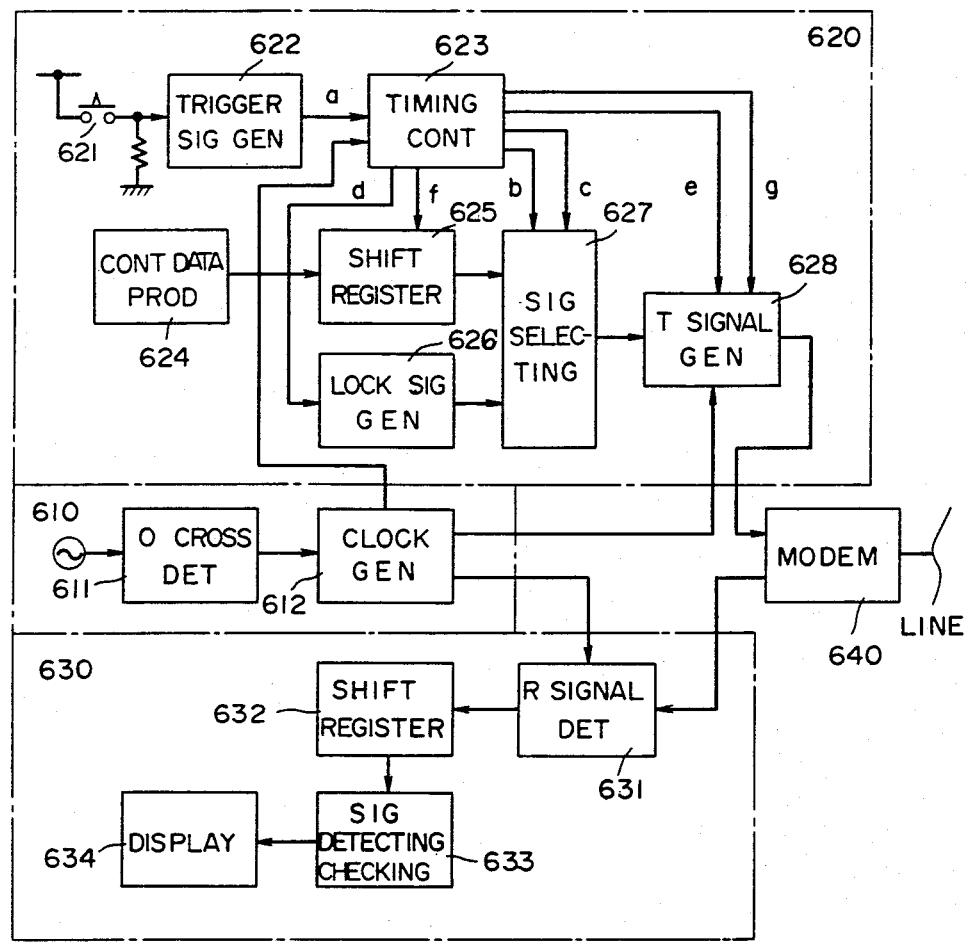
FIG. 6A is a schematic block diagram showing a preferred embodiment of a transmitter in accordance with the present invention.

Turning to FIG. 6A, there is shown schematically a preferred embodiment of a transmitter in accordance with the present invention. The transmitter includes three portions enclosed with dotted chain lines, that is, a transmitting portion 620 for generating a transmitting signal, a receiving portion 630 for receiving a reply signal from a receiver and a timing clock portion 610 for operating the transmitting portion 620 and the receiving portion 630 in synchronism with a zero-cross signal. A modem for modulating and demodulating a signal is provided between the transmitting and receiving portions 620 and 630 and a power line of a 3-phase alternating current power supply. Each of these portions will be described in detail in the following in accordance with FIG. 6A.

First, the timing clock portion 610 will be explained. A zero-cross detecting portion 611 connected to one power line of a 3-phase alternating current detects the zero-cross points of its own phase, that is, of the phase to which the transmitter is connected, and provides zero-cross pulses to a clock generating portion 612. The clock generating portion 612 having an internal clock generates clock signals necessary for the transmitting and receiving portions 620 and 630 using the internal clock, both for which the zero-cross pulse from the zero-cross detecting portion 611 is used as a reference. The clock signals are sent to a timing control portion 623, a transmitting signal generating portion 628 in the transmitting portion 620 and a reply signal detecting portion 631 in the receiving portion 630.

Next, the transmitting portion 620 will be described. In the structure of the transmitting portion 620, a trigger signal generating portion 622 connected to a transmitting start switch 621 is responsive to the switching thereof to send to a timing control portion 623 a trigger signal for enabling the timing control portion 623. The timing control portion 623 sends a timing signal for controlling the timing necessary for providing a signal to be transmitted signal to a shift register 625, a lock signal generating portion 626, a signal selecting portion 627 and a transmitting signal generating portion 628. The signal selecting portion 627 selects one of a lock signal generated in the lock signal generating portion 626 and control data, the latter being produced in a control data producing portion 624 and converted from parallel form to serial form in a shift register 625, so that the selected one is sent to a transmitting signal generating portion 628. The transmitting signal generating portion 628 receives a signal from the signal selecting portion 627, which is a logic signal, and coverts the same into a carrier signal in synchronism with the clock signal from the above described timing clock portion 610. The carrier signal is sent to the modem 640 so that the same is superimposed on the 3-phase alternating current.

Figure 6B:
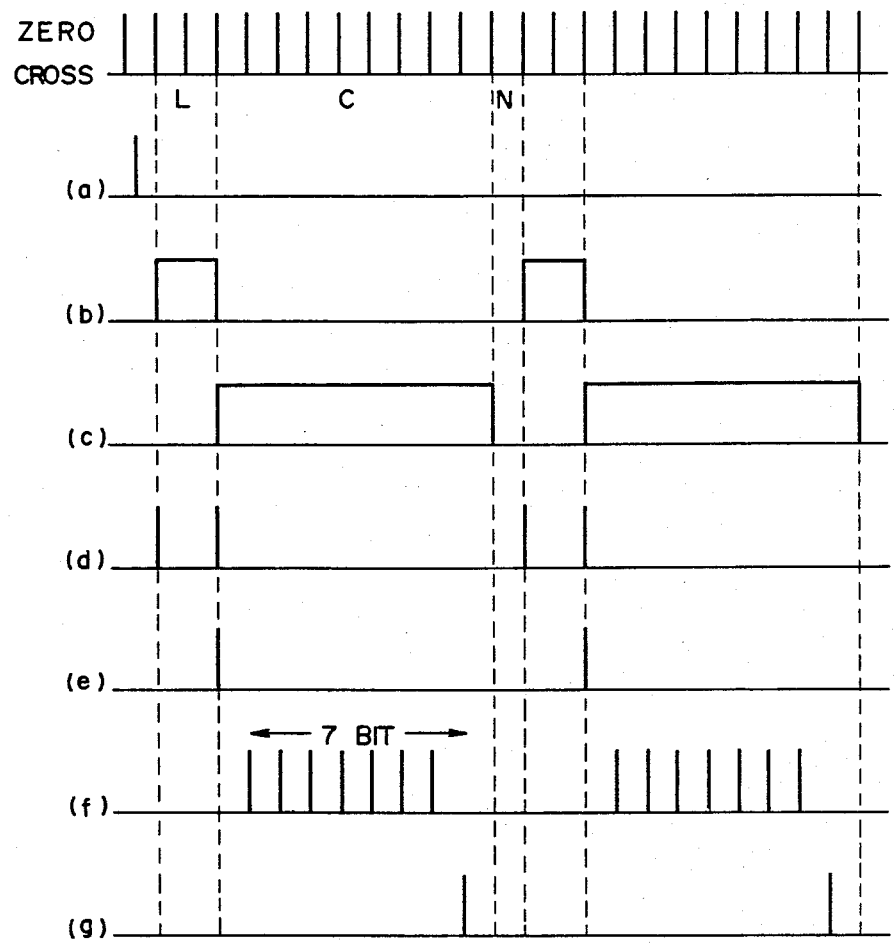
FIG. 6B is a timing chart showing waveforms (a) to (g) for explaining the operation of the transmitter as shown in FIG. 6A.

FIG. 6B shows the timing charts of the signals (a) and (g) on the respective signal lines indicated in FIG. 6A, for explaining the operation of the transmitting portion 620 structured as described in the foregoing. A trigger signal generating portion 622 generates a trigger pulse in response to the switching of the transmitting start switch 621, as shown in the timing chart of signal (a). The timing control portion 623 is enabled upon receipt of the trigger pulse. The role to be played by the timing control portion is to control the operating timing of each portion in the transmitting portion 620 so that the data is sent out in synchronism with the zero-cross signals. Accordingly, the timing control portion 623 receives the zero-cross pulse from the clock generating portion 612 and controls the operation of each portion in the following manner by using the received zero-cross pulse as a reference.

First, at the first zero-cross point immediately after the trigger, a lock signal generating portion selecting signal (b) is sent to the signal selecting portion 627. The signal selecting portion 627 is responsive to the signal (b) to select the lock signal generating portion 626. At the same time, a set signal (d) is sent to the lock signal generating portion 626. The lock signal generating portion 626 is responsive to the signal (d) to generate the data of the lock signal. In the present embodiment, for the purpose of simplicity of the apparatus, the data in the lock signal is made the same as the data "1" structuring the control signal. More particularly, if the control data "1" is indicated by the code format of "0111" in the four respective sections of the zero-cross interval, the lock signal is also indicated by the code format of "0111". Since the receiver of the present invention has a lock function, a "1" of the control data is never erroneously deemed as a lock signal. It is also possible to make the lock signal different from "1" of the control data. In such the case, the lock signal may be handled in the same manner as a start signal and an end signal described subsequently.

In such a way, the lock signal generating portion 626 in accordance with the preferred embodiment generates the control data "1", that is, a signal of high level. The lock signal is sent to the transmitting signal generating portion 628 through the signal selecting portion 627. After the state continues for two zero-cross intervals, the state is terminated by the reset signal (d) from the timing control portion 623. More particularly, the lock signal generating portion 626 is reset. At the same time, a shift register selecting the signal (c) instead of the lock signal generating portion selecting signal (b) is sent to the signal selecting portion 627, so that the interval L for the lock signal is terminated.

The transmitting signal generating portion 628 receives a lock signal of high level and generates a corresponding signal "0111". It is predetermined that the data "1" corresponds to the signal "0111" in a single zero-cross interval. The corresponding signal is generated in synchronism with the clock signal sent from the clock generating portion 612. More particularly, the clock signals are signals for dividing a single zero-cross interval into four sections.

The signal selecting portion 627 receives the shift register selecting signal (c) to select a shift register 625. At the same time, a start signal generating pulse (e) is sent out from the timing control portion 623 to the transmitting signal generating portion 628. Upon receipt of the pulse (e), the transmitting signal generating portion 628 generates a predetermined start signal of "0101", for example, during a single zero-cross interval. At the same time of the termination of the start signal, a clock (f) for reading is applied to the shift register 625 from the timing control portion 623. The shift register 625 sends to a transmitting signal generating portion 628 through the signal selecting portion 627 a parallel control data produced in the control data producing portion 624 in synchronism with the clock (f) in a bit by bit manner. The control data indicates an address of a receiver which is to receive the signal and a manner of controlling a load, that is, the control data comprises an address signal and a load controlling signal. The control data is produced by an external operation prior to the switching of the transmitting start switch 621. The number of bits of these signals is predetermined, and, in the example, both signals comprise 7 bits. The transmitting signal generating portion 628 receives the control data bit by bit and generates a corresponding signal. The manner of generation was described in the foregoing. For example, a signal of "0111" corresponding to the data "1" and a signal of "0100" corresponding to the data "0" are generated.

Upon completion of the processing of the data of 7 bits, the timing control portion 623 provides an end signal generating pulse (g) to the transmitting signal generating portion 628. The transmitting signal generating portion 628 receives the pulse (g) and generates an end signal of "0001", for example, in a carrier signal manner for a single zero-cross interval. At the same time as the termination of the end signal, the signal selecting portion 627 is rendered in a neutral state in which any of the selectable signals is not selected. More particularly, no selecting signal is applied from the timing control portion to the signal selecting portion. As a result, the interval C shown in FIG. 6B for the control signal is completed and the interval N for a non-busy signal starts. During the interval N, the transmitting signal generating portion 627 generates no carrier signals (which means a signal of "0000"), since the portion 627 does not receive any data. In such a way, a carrier signal generated in the transmitting signal generating portion 628 is superimposed on the 3-phase alternating current in the modem 640 to be sent to a receiver.

Lastly, the receiving portion 630 will be explained. A reply signal detecting portion 631 receives a reply signal from a receiver, which is demodulated in the modem 640, and converts the same into a logic signal in synchronism with a clock from the clock generating portion 612. The signal is applied to a signal detecting and checking portion 633 after the same is converted from serial to parallel form in the shift register 632. The signal detecting and checking portion 633 checks the contents of the signal and controls a displaying portion 634 so as to make a display corresponding to the contents.

Referring to FIG. 7, a preferred embodiment of a receiver in accordance with the present invention is shown schematically. The receiver comprises a modem 71 connected to a power line of a 3-phase alternating current for demodulating a carrier superimposed on the 3-phase alternating current, a synchronizing portion 171 receiving a lock signal from the modem 71 and zero-cross signals from the zero-cross signal generating circuit (not shown) and producing a synchronization signal for receiving, and a load controlling portion 172 receiving the control signal from the modem 71 and a synchronization signal from the synchronizing portion 171 and connected to the modem 71 and the synchronizing portion 171 for controlling a load. More particularly, the synchronizing portion 171 comprises a lock signal detecting portion 74 for detecting a lock signal from the modem 71, a synchronization signal producing portion 75, which acts in response to a detection output that is provided from the lock signal detecting portion 74, for producing the synchronization signal for reception by operating the phase of a zero-cross signal, a lock circuit 76, which acts in response to the first occurrence of the detection output from the lock signal detecting portion 74, for disabling the synchronization signal producing portion 75 so that the synchronization signal producing portion 75 is not responsive to the detection outputs that occur subsequently to the first detection output, a lock releasing portion 77 for detecting the interval corresponding to a non-busy signal from the modem 71 and for releasing the disabling of the synchronization signal producing portion 75. The load controlling portion 172 comprises a signal detecting and checking portion 72 for detecting and checking the control signal from the modem 71 in synchronism with a synchronization signal from the synchronizing portion 171, and a relay drive circuit 73, which acts in response to a detecting and checking output from the signal detecting and checking portion 72, for driving a relay 78 for controlling a load. The specific structure of each of the blocks is subsequently described in connection with FIG. 8 and the further drawings.

The operation of the receiver as shown is now explained referring to FIG. 7. The modem 71 connected to an arbitrary phase of a power line of a 3-phase alternating current receives a 3-phase alternating current on which a carrier signal is superimposed and demodulates the same so as to withdraw a carrier signal. The carrier signal withdrawn is sent to the lock signal detecting portion 74, the lock releasing portion 77 and the signal detecting and checking portion 72, respectively. The lock signal detecting portion 74 receives the carrier signal and detects a lock signal existing in the beginning of the signal in which its own zero-cross point, that is, of the phase to which the modem 71 is connected, is used as a reference. As described in the foregoing with reference to FIG. 3, three examples wherein manner of this detecting are described. Taking again the case wherein signal superimposed on an R phase is received in an R phase, the received signal is detected as "00111111", while for the case wherein the signal superimposed on the R phase is received in an S phase, the received signal is detected as "11X0X111". In addition, for the case wherein the signal superimposed on the R phase is received in a T phase, the received signal is detected as "11111X0X". The detection output is sent out to the lock circuit 76 to well as the synchronization signal generating portion 75.

The synchronization signal producing portion 75 receives the detection output and produces a synchronization signal for use in reception of a control signal which is sent subsequently to the lock signal. The detection output of "00111111" indicates that a receiver and a transmitter are connected to the same phase. Thus, in such a case, the synchronization signal producing portion 75 outputs its own zero-cross signal to a signal detecting and checking portion 72 as a synchronization signal. The detection output of "11X0X111" indicates that the zero-cross timing of the phase to which a transmitter is connected is later by 60 degrees than the zero-cross timing of the phase to which a receiver is connected. Thus, in such a case, the synchronization signal producing portion 75 outputs to the signal detecting and checking portion 72 a signal which is delayed by 60 degrees with respect to its own zero-cross signal as a synchronization signal. The detection output of "11111X0X" indicates that the zero-cross timing of the phase to which the transmitter is connected is later by 120 degrees than the zero-cross timing of the phase to which the receiver is connected. Accordingly, in such a case, the synchronization signal producing portion 75 outputs to the signal detecting and checking portion 72 as a synchronization signal a signal which is delayed by 120 degrees with respect to its own zero-cross signals.

The signal detecting and checking portion 72 determines, detects and checks a control signal which is sent from the modem 71 in synchronism with the synchronization signal. The control signal includes a start signal, an address signal, a load controlling signal and an end signal, as described in the foregoing. The operation of the signal detecting and checking portion 72 is initiated in response to determination of the start signal and is terminated in response to determination of the end signal. The signal detecting and checking portion 72 makes a subsequently described comparing operation for the address signal and the load control signal subsequent to the start signal and if the address signal coincides with the address of the receiver, the portion 72 operates the relay driver circuit 73 and drives the relay 78 for controlling a load.

On the other hand, a lock circuit 76 is responsive to the first detecting output from the lock signal detecting portion 74 for making the synchronization signal producing portion 75 not respond to the detection output that occurs subsequently to the first detection output, that is, for locking the synchronization signal producing portion 75. As a result, after the synchronization signal which is an output from the synchronization signal producing portion 75 is provided in response to the first detection output from the lock signal detecting portion 74 as described in the foregoing, the synchronized relation is maintained until the lock is released as described subsequently.

The release of the lock is made in the lock releasing portion 77. The lock releasing portion 77 receives a signal from the modem 71 and detects a non-busy signal interval contained in this signal. Upon detection of the non-busy signal interval, the lock releasing portion 77 makes the synchronization signal producing portion 75 be responsive to the detecting output from the lock signal detecting portion, that is, the lock is released. Accordingly, it should be understood that for the case wherein the lock signal detecting portion 74 subsequently detects a lock signal, a synchronization signal corresponding thereto is newly applied. If and when the lock signal comes from a phase different from the previous phase, the synchronization signal is correspondingly changed, but if the clock signal comes from the same phase as a previous phase, the synchronization signal is again provided in the same manner. In such a way, a receiver can be obtained wherein in the course of reception of a series of signals, with each of the signals including of a lock signal and a control signal, the synchronization signal is not changed and the lock is released in response to termination of the series of signals. It may be possible to release a lock in response to detection of an end signal, which will be described in the following.

Figure 8:
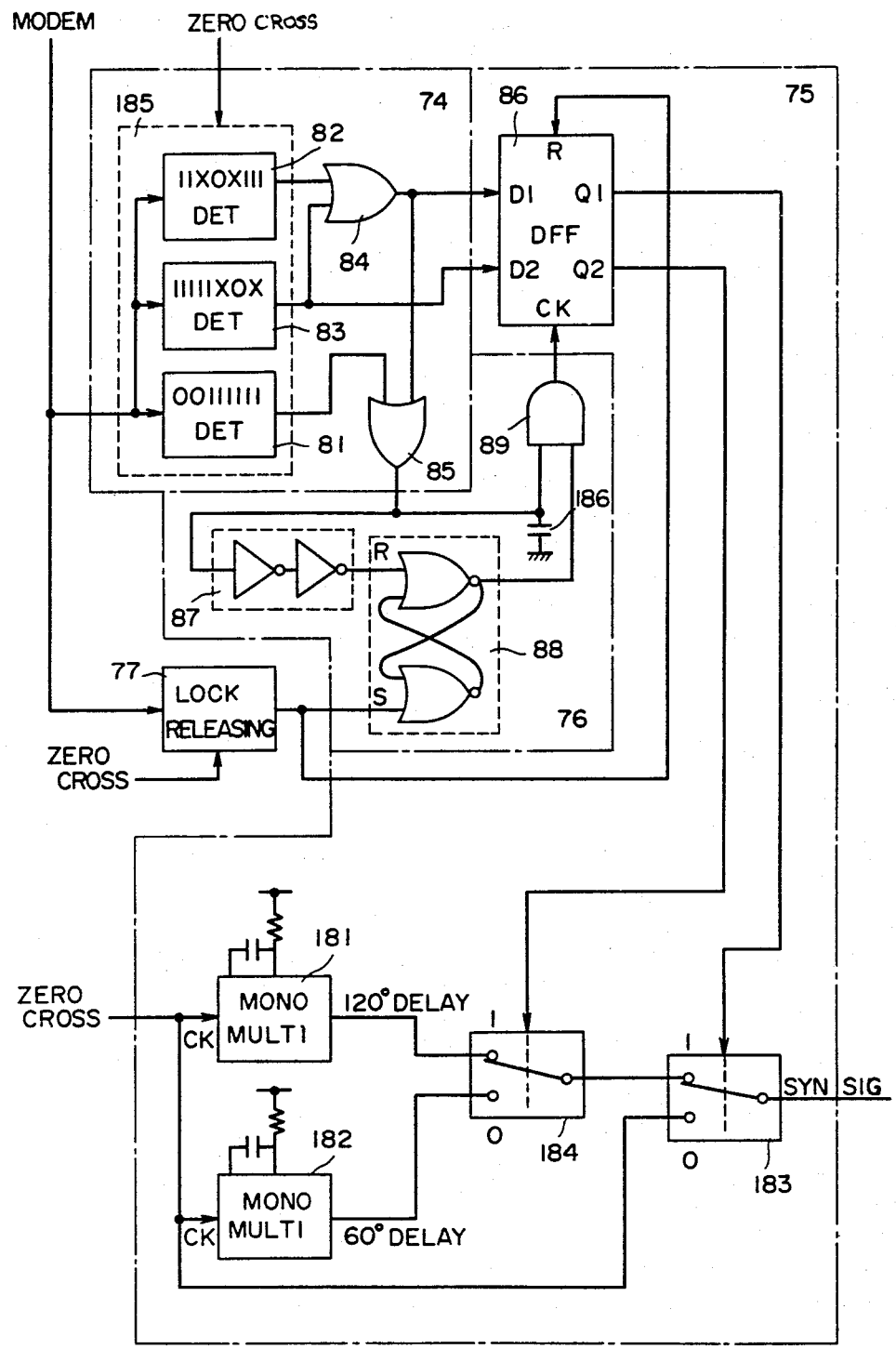
FIG. 8 shows the synchronizing portion 171 of FIG. 7.

FIG. 8 shows in detail the synchronizing portion 171 shown in FIG. 7. The lock signal detecting portion 74, the synchronization signal producing portion 75 and the lock circuit 76 shown in FIG. 7 are enclosed in a dotted chain lines, each portion being labeled by the same reference numerals as in FIG. 8. The lock signal detecting portion 74 comprises a "00111111" detecting portion 81, a "11X0X111" detecting portion 82 and a "11111X0X" detecting portion 83, which receive the respective signals from the modem. The lock signal detecting portion 74 further comprises an OR gate 84 receiving a "11X0X111" detection output at one input thereof and a "11111X0X" detection output at the other input thereof, and an OR gate 85 receiving a "00111111" detection output at one input thereof and the output from the OR gate 84 at the other input thereof. The lock circuit 76 includes a buffer 87 receiving an output from the OR gate 85 contained in the lock signal detecting portion 74, an RS flip-flop 88 receiving an output from the buffer 87 at a reset terminal R thereof and an output from the lock releasing portion 77 at a set terminal S thereof, and an AND gate 89 receiving an output from the RS flip-flop 88 at one input thereof and an output from the OR gate 85 contained in the lock signal detecting portion 74 at the other input thereof. The synchronization signal producing portion 75 comprises a D-type flip-flop 86 receiving an output from the OR gate 84 contained in the lock signal detecting portion 74 and an output from the "11111X0X" detecting portion 83 in the lock signal detecting portion 74. The D-type flip-flop 86 receives an output from the AND gate 89 in the lock circuit 76 at a clock terminal CK thereof and an output from the lock releasing portion 77 at the reset terminal R thereof. The outputs Q1 and Q2 from the D-type flip-flop 86 are applied to the switches 183 and 184 included in the synchronization signal producing portion 75, respectively, as control inputs thereto. One input side of the switch 183 is connected to the output side of the switch 184. A zero-cross signal is applied to the other input side of the switch 183. One input side of the switch 184 is connected to a monostable multivibrator 181 for delaying a received zero-cross signal by 120 degrees. The other input side of the switch 184 is connected to a monostable multivibrator 182 for delaying a received zero-cross signal by 60 degrees.

The specific structure of the synchronization signal portion as shown in FIG. 8 can be used to completely achieve the operation of the synchronizing portion 171 as described in conjunction with FIG. 7.

Figure 9:
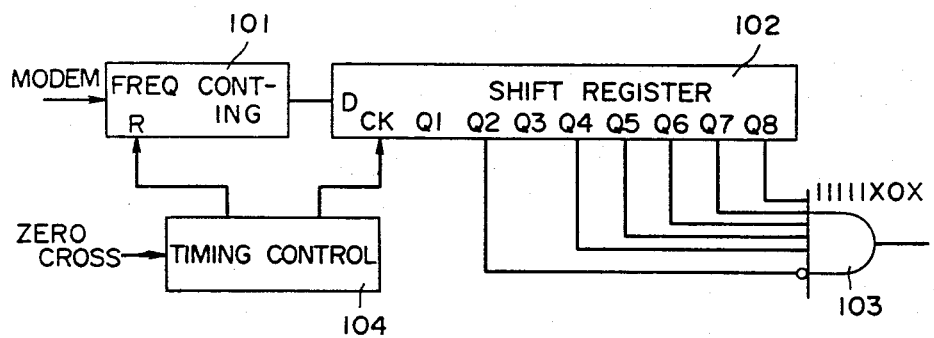
FIG. 9 shows specifically the "11111X0X" detecting portion 83 of FIG. 8.

FIG. 9 shows an embodiment of the "11111X0X" detecting portion 83, as an example of three detecting portions 81, 82 and 83 contained in the lock signal detecting portion 74 shown in FIG. 8. It can be easily understood that the other detecting portions are similarly structured. A frequency counting portion 101 is connected to the modem 71 and receives a carrier signal demodulated by the modem 71 therefrom. The frequency counting portion 101 counts the number of repetitions of the carrier signal so that an output is withdrawn depending on the presence or absence of the carrier. The timing in this counting is controlled by a timing control portion 104 which is synchronized with the zero-cross signal of the phase to which the receiver is connected. More particularly, the timing control portion 104 is responsive to a single zero-cross signal to provide eight reset timing signals to a reset terminal R of the frequency counting portion 101, so that the frequency counting portion 101 can repeat a counting operation eight times for each zero-cross interval. The frequency counting portion 101 provides to a shift register 102 a logical "1" output indicating that a carrier input exists only if the number of counts exceeds a predetermined value which is provided for the purpose of distinguishing clearly between noise and a carrier signal. It can be easily understood that the predetermined value of the number of the counts depends on the frequency of the carrier and the time period for the counting operation. For the case wherein the number of counts does not reach the predetermined value, a logical "0" output indicating that no carrier input exists is applied to the shift register 102. The shift register 102 reads the logical "1" or ligical "0" output from the frequency counting portion 101. This reading is made in synchronism with a reading clock generated in the timing control portion 104. Of the Q1 to Q8 outputs in the shift register 102, only the Q2 and Q4 to Q8 outputs are applied to an AND gate 103, in which the Q2 output is inverted. Accordingly, the logical "1" output from the AND gate 103 is withdrawn only if the output from the shift register 102 becomes "11111X0X". Thus, the "11111X0X" detecting portion as shown in FIG. 9 detects whether the signal from the modem is "11111X0X" or not. Similarly, the "00111111" and "11X0X111" signals from the modem are detected in the "00111111" detecting portion 81 and "11X0X111" detecting portion 82 in FIG. 8, respectively.

Figure 10:
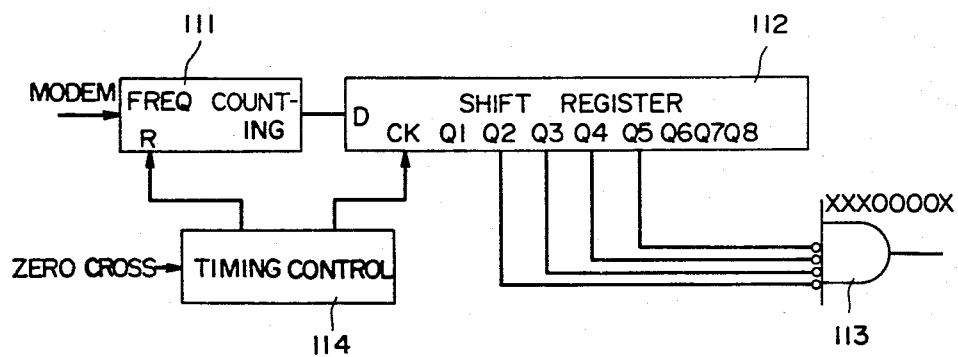
FIG. 10 specifically shows the lock releasing portion 77 of FIG. 8.
Figure 11:
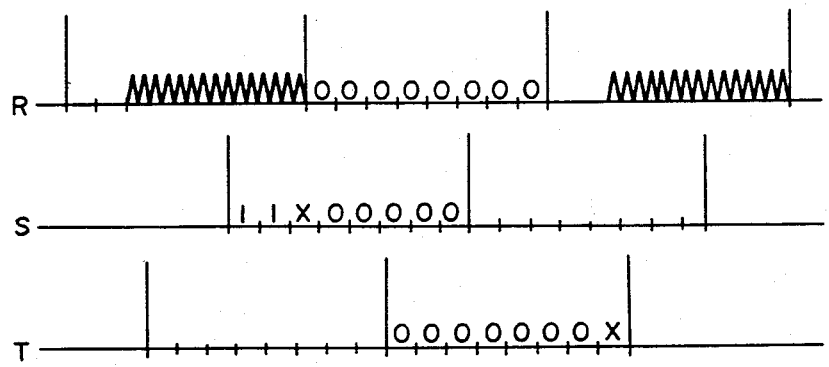
FIG. 11 is a diagram for explaining the detection of a non-busy signal period.

Now, referring to FIG. 10, an example of the lock releasing portion 77 shown in FIGS. 7 and 8 is described. A frequency counting portion 111, a shift register 112 and a timing control portion 114 as shown herein are structured and operate in the same manner as the above-described frequency counting portion 101, shift register 102 and timing control portion 104 of FIG. 9. Of the Q1 to Q8 outputs in the shift register 112, only the Q2 to Q5 outputs are applied to an AND gate 113, these outputs being all inverted. Accordingly, the logical "1" output from the AND gate 113 is withdrawn only if the output from the shift register 112 becomes "XXX0000X". The logical "1" output from the AND gate 113 is provided as a lock releasing signal. Since the release of the lock is made by detecting the above-described non-busy signal interval (that is, the interval of "00000000"), it is easily seen that the logical "1" output from the AND gate 113 must be withdrawn when the output from the shift register 112 is "00000000". However, in case where only one zero-cross interval is used as the non-busy signal interval, a lock releasing signal must be supplied by detecting "XXX0000X" in consideration of the situation wherein a receiver is erroneously locked to a separate phase due to influence of noise or the like. More particularly, in a different phase, the "00000000" signal is received as a "0000000X" or "11X00000" signal, as shown in FIG. 11. In order to securely provide a lock release signal no matter which one of the three signals is received, it is sufficient that only the common "0"s, that is "XXX0000X" is detected. If two or more, preferably two, zero-cross intervals are used as a non-busy signal interval, "00000000" may as well be detected. Thus, the lock releasing portion as shown in FIG. 10 detects a non-busy signal interval in the signal from the modem.

Returning to FIG. 8, the case wherein a non-busy signal interval is provided will be considered. The lock releasing portion 77 detects a non-busy signal interval, as described in the foregoing, and sets the RS flip-flop 88 and resets the D-type flip-flop 86. Thus, in this case, the outputs Q1 and Q2 from the D-type flip-flop 86 controlling switches 183 and 184, respectively, both are logical "0". The switch 183 is coupled to the output of the switch 184 in response to the control input of the logical "1", and is coupled to the zero-cross signal in response to the control input of the logical "0". The switch 184 is connected to the monostable multivibrator 181 for delaying the zero-cross signal by 120 degrees in response to the control input of the logical "1" and is connected to the monostable multivibrator 182 for delaying the zero-cross signal by 60 degrees in response to the control input of the logical "0". In the situation being considered, the Q1 output from the D-type flip-flop 86 is "0" and thus the switch 183 is coupled to the zero-cross signal which is withdrawn as a synchronization signal. On the other hand, as described in the foregoing, the RS flip-flop 88 is set by the detection signal output from the lock releasing portion 77. Thus, the output from the RS flip-flop 88 is applied to one input of the AND gate 89. With such a state, it is clear that the output signal from the OR gate 85, which is the detection output from the lock signal detecting portion 74, is applied to the clock input CK of the D-type flip-flop 86. Accordingly, the synchronization signal producing portion 75 is in a state that is responsive to the next detection output from the lock signal detecting portion 74. The details of the response will be described in the following. In such a way, the signal from the lock releasing portion 77 indicating that a non-busy signal interval was detected causes the synchronization signal producing portion 75 to be responsive to the lock signal detecting portion 74, which means that the lock is released, and causes the zero-cross signal to be applied as a synchronization signal.

Next, a lock signal subsequent to a non-busy signal interval will be considered. As described in the foregoing, the lock signal is detected by any of three detecting portions 81, 82 and 83. It is clear that any detection output that is provided from any of the detecting portions 81, 82 and 83 can be withdrawn as an output from the OR gate 85. The output from the OR gate 85 is applied to the clock input CK in the D-type flip-flop 86 through the above described AND gate 89. It should be noted that the clock input is applied slightly later than the output from the OR gate 85 due to a capacitance 186. The output from the OR gate 85 is also applied to the buffer 87 to lock the synchronization signal producing portion 75, which will be described subsequently. On the other hand, the logical state of the inputs D1 and D2 of the D-type flip-flop 86 are determined as in the following, depending on which detecting portion detects a lock signal:

for detection of "00111111" D1=0, D2=0,
for detection of "11X0X111" D1=1, D2=0, and
for detection of "111111X0X" D1=1, D2=1

The D-type flip-flop is clocked immediately after any one input of the above described inputs is applied, and provides the outputs Q1 and Q2. Thus, the combination of the logical states of the outputs Q1 and Q2 from the D-type flip-flop 86 is as follows; Q1=0, Q2=0 when the lock signal is detected as "00111111"; Q1=1, Q2=0 when the lock signal is detected as "11X0X111"; and Q1=1, Q2=1 when the lock signal is detected "11111X0X". The switches 183 and 184 receive these outputs Q1 and Q2, respectively and are controlled as described in the foregoing. Accordingly, depending on how the lock signal is detected, the synchronization signal is applied as in the following:

for detection of the lock signal as "00111111" zero-cross signal,
for detection of the lock signal as "11X0X111" the zero-cross signal delayed by 60 degrees, and
for detection of the lock signal as "11111X0X" the zero-cross signal is delayed by 120 degrees Thus, synchronization of signal between a transmitter and a receiver can be achieved.

On the other hand, the output signal from the OR gate 85 which is a detection output of a lock signal is also applied to the buffer 87 as described in the foregoing. The buffer 87 delays the signal by an appropriate time period which is at least larger than the time period of the delay due to the capacitance 186. The delayed signal resets the RS flip-flop 88. Thus, immediately after the D-type flip-flop 86 is clocked, the logical "0" signal is applied to one input terminal of the AND gate 89. Therefore, even if, from that time, the logical "1" signal is applied to the other input terminal of the AND gate 89 connected to the output of the OR gate 85, the logical "1" output of the AND gate 89 is not applied for clocking the D-type flip-flop 86. More particularly, the D-type flip-flop 86 cannot provide a corresponding output in response to the subsequent detecting output of the lock signal. This means that even if a lock signal is detected (which lock signal is considered to be due to the influence of noise or the like), after a response to a detecting output of the first lock signal an output from the D-type flip-flop 86, which corresponds to the detection output, (in other words, the corresponding synchronization signal) is provided, the synchronization signal is not changed in the course of reception of a sequence of signals. Thus, the synchronization signal producing portion 75 is locked immediately after the first lock signal is detected and is not operative to respond to the subsequent detection of the lock signal. As described in the foregoing, the lock is released in a non-busy signal interval subsequent to the sequence of the signals.

Figure 12:
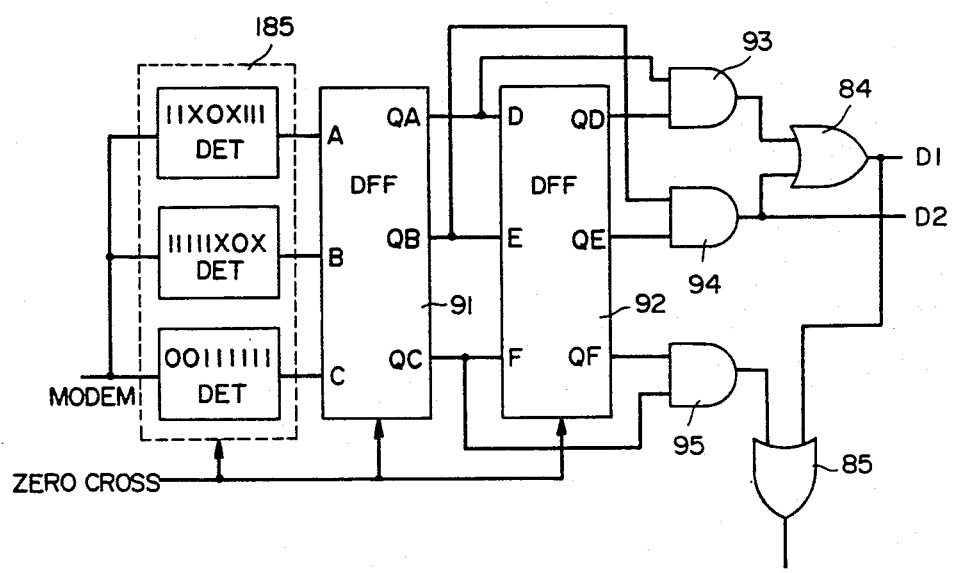
FIG. 12 shows another preferred embodiment of the lock signal detecting portion 74 of FIG. 8.

Now, referring to FIG. 12, another preferred embodiment of the lock signal detecting portion 74 shown in FIG. 8 is described. In this embodiment, a corresponding synchronization signal is provided when the lock signal in the is detected twice successively in the same manner, so that reliability is enhanced. As already described in the foregoing, as a premise of the present embodiment, it is necessary to send the lock signal at least three times. The detection outputs from the detecting portions 81, 82 and 83 detecting a lock signal in synchronism with the zero-cross signal are applied to the inputs A, B and C of the D-type flip-flop 91, respectively, which are clocked by the zero-cross signal. The outputs $Q_A$, $Q_B$ and $Q_C$ from the D-type flip-flop 91 are applied to the inputs D, E and F of the D-type flip-flop 92 clocked by the zero-cross signal, respectively, and are also applied to one input of the AND gates 93, 94 and 95, respectively. The outputs $Q_D$, $Q_E$ and $Q_F$ from the D-type flip-flop 92 are applied to the other inputs of the AND gates 93, 94 and 95, respectively. It is noted that each of the outputs of the AND gates 93, 94 and 95 corresponds to each of the outputs of detecting portions 81, 82, and 83 in FIG. 8. Accordingly, the OR gates 84 and 85 indicated in FIG. 12 are the same as those in FIG. 8.

As an example, the case of detection of a lock signal as "11X0X111" will be described, as an example, since detection as other signals is the same. An A input of the D-type flip-flop 91 is applied in response to the first detection output and subsequently, the $Q_A$ output from the D-type flip-flop 91, that is, the D input of the D-type flip-flop 92 is provided in response to the clock of the zero-cross signal. The clock of the zero-cross signal subsequent to the second detection output provides the $Q_A$ output and at the same time, provides the $Q_D$ output. Accordingly, both inputs are applied to the AND gate 93 and thus the AND gate 93 outputs a detection output indicating that the lock signal in an identical manner is provided twice. For the case wherein the second lock signal is detected in a manner different from the first time, the detection output is not provided since only one input is applied to the AND gate. In such a way, only if a lock signal is detected successively twice in the same manner, is the detection output for setting a corresponding synchronization signal applied and thus the reliability is enhanced. Therefore, mulfunction due to noise and the like can be avoided.

Figure 13:
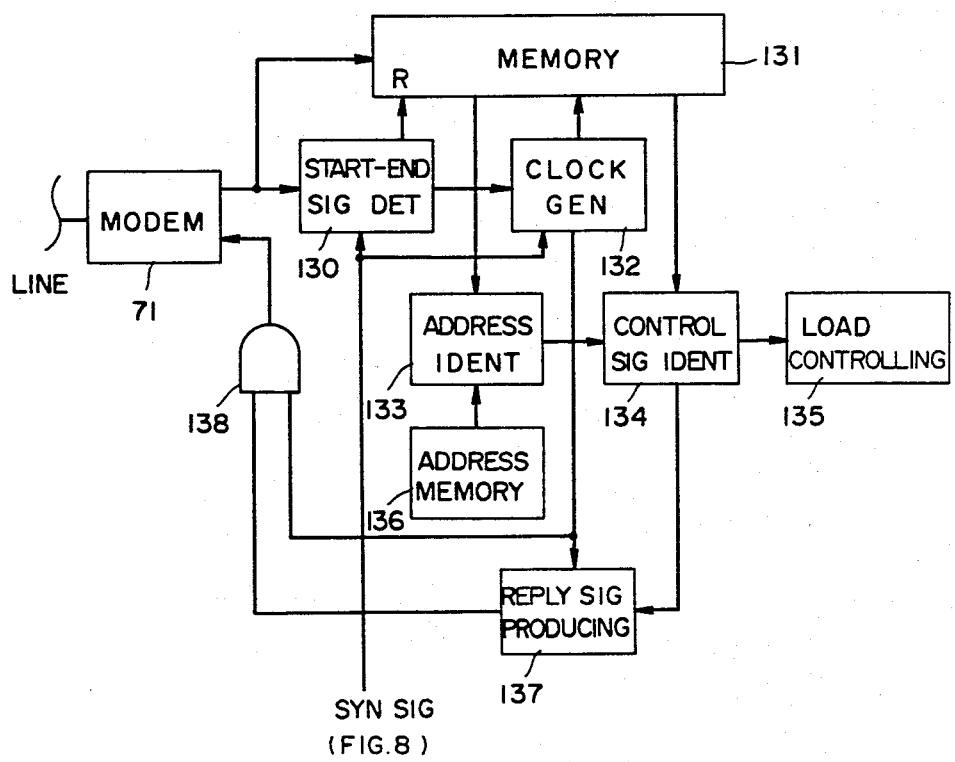
FIG. 13 shows the load control portion 172 of FIG. 7.

Lastly, FIG. 13 shows in detail, the load control portion 172 in FIG. 7. Since this portion is not so important to the present invention, the structure and operation thereof will be briefly described in the following. A carrier signal demodulated in the modem is applied to a start-end signal determining portion 130 and a memory 131. In this step, the carrier signal is converted to a signal of a logical level. The start-end signal determining portion 130 detects a start signal and an end signal in synchronism with a synchronization signal generated as described in the foregoing. The determining portion 130 enables a clock generator 132 for generating a clock signal in synchronism with a synchronization signal when the start signal is detected. The memory 131 stores an address signal and a load controlling signal based on the clock signal. At the same time, the address signal is read out from the memory 131 and is applied to the address identifying portion 133. When the address signal coincides with an address preset in an address memory 136, the address identifying portion 133 provides a coincidence signal to a control signal identifying portion 134 and enables the same. The control signal identifying portion 134 reads out a load control signal from the memory 131 and identifies a type of control (for example, turning ON or OFF of a power supply for a load, and the like), so that a load controlling portion 135 is operated to make a desired control to the load. At the same time, the control signal identifying portion 134 enables the reply signal producing portion 137. The reply signal producing portion 137 produces a reply signal corresponding to the state of the load to be controlled. The reply signal is applied to one input of the AND gate 138 and a clock generated in the clock generator 132 is applied to the other input of the AND gate 138. Thus, the AND gate 138 applies to the modem 71 a reply signal synchronized with the clock signal. The reply signal is modulated in the modem 71 and is sent to a transmitter through a power line of a 3-phase alternating current.

As described in the foregoing, the release of the lock may be made in response to the detection of the end signal. In such case, an end signal determining output from the start-end signal determining portion 130 shown in FIG. 13 is substituted for a non-busy signal interval detecting output from the lock releasing portion 77 shown in FIGS. 7 and 8. Therefore, the lock releasing portion 77 is not needed. However, the end signal is not necessary for control data and hence, this approach cannot be used in case where an end signal is not included in a control data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission system utilizing a power line of a 3-phase alternating current power supply for supplying a 3-phase alternating current for transmission of data in synchronism with the cycles of said alternating current, said data transmission system comprising:

At least one transmitter, each coupled to any respective one of the phases of said power line; and
   at least one receiver, each coupled to any respective one of the phases of said power line;
   each said transmitter comprising
   lock signal generating means for generating a lock signal for providing a respective synchronization between the transmitter and each of the receivers,
   data generating means for generating data to be transmitted to each said receiver, and
   sending timing control means for controlling the sending of said lock signal and said data to have timing so that said data is sent subsequently to said lock signal, in synchronism with the cycles of the phase to which the transmitter is connected, and
   each said receiver comprising
   lock signal receiving means for receiving each said lock signal in synchronism with the cycles of the phase to which the receiver is connected,
   phase shift detecting means for detecting the phase shift between the phase of each said lock signal as transmitted by the respective transmitter and as received in the receiver, based on the received lock signal,
   synchronizing means for providing, in response to an output from said phase shift detecting means, a respective synchronization between each said receiver receiving said lock signal and the respective transmitter which is sending said received lock signal,
   locking means for locking said synchronization means so that synchronization is maintained after said providing of said synchronization,
   termination detecting means for detecting termination of said data transmission, and
   lock releasing means for releasing said locking means, in response to an output from said termination detecting means, so that said synchronization can be changed.

2. A data transmission system in accordance with claim 1, wherein
   said locking means comprises disabling means for disabling said synchronizing means, and
   said lock releasing means includes means for reenabling said synchronizing means for the operation of said phase shift detecting means.

3. A data transmission system in accordance with claim 1 or 2, wherein
   said sending timing control means providing a non-busy signal interval after each said sending of said lock signal and said data, and
   said termination detecting means includes means for detecting the non-busy signal interval after the data transmission is terminated.

4. A data transmission system in accordance with claim 1 or 2, wherein
   said data includes an end signal indicating the end of the data, and
   said termination detecting means includes means for detecting said end signal.

5. A data transmission system in accordance with claim 3, wherein
   said sending timing control means controls the timing for sending so that, after a predetermined time period after the transmission of said data subsequent to said lock signal, the same lock signal and said data are again transmitted in the same order a predetermined number of times.

6. A data transmission system in accordance with claim 5, wherein
   each bit of said data is transmitted during a period corresponding to a half cyle of said alternating current, and
   said non-busy interval has a period equal to at least a half cycle of said alternating current.

7. A data transmission system in accordance with claim 1, wherein
   one bit of said data is tramsmitted during a period corresponding to a half cycle of said alternating current,
   each said lock signal has at least two bits, and all of said lock signals have the same predetermined code format, and
   each said phase shift detecting means includes a first detector for detecting, according to said predetermined code format, when the phase of the lock signal as transmitted is the same as the phase as received, and second and third detectors for respectively detecting two different predetermined code formats when the phase of the lock signal as received corresponds respectively to the other phases of said 3-phase alternating current.

8. A data transmission system in accordance with claim 7, wherein
   each said lock signal has at least three bits, and
   said phase shift detecting means provides an output when the lock signal is successively detected two times by the same one of said first, second and third detectors.

9. A data transmission system in accordance with claim 1, said at least one transmitter and said at least one receiver being coupled to a different one of said phases of said power line.

10. A data transmission system in accordance with claim 9, comprises a plurality of said receivers connected to at least two of the phases of said power line.

* * * * *

UNITED STATES PATENT AND TRADEMARK OFFICE
CERTIFICATE OF CORRECTION

PATENT NO. : 4,514,719

DATED : Apr. 30, 1985

INVENTOR(S) : YOSHIHARU SUZUKI et al

It is certified that error appears in the above-identified patent and that said Letters Patent is hereby corrected as shown below:

```
Column 1, line 27, "the" should be --a--; "a" should be
--the--; after "current" insert --at--;
          line 44, "T," should be --T--; delete "to";
          line 58, "a" (second occurrence) should be --as--.

Column 2, line 10, "is" should be --signal as--;
          line 11, after "signal" insert --is--;
          line 46, after "between" insert --the--.

Column 6, line 33 delete "signal";
          line 44, "coverts" should be --converts--;
          line 50, "and" should be --to--.

Column 7, line 17, after "from" insert --the--;
          line 18, "the" should be --a--.

Column 9, line 23, "wherein" should be --of the--;
          line 33, "to" should be --as--; after "as" insert
--to--.

Column 10, line 41, delete "of".

Column 11, line 61, "ligical" should be --logical--.

Column 13, line 51, after "signal" insert --is--;

Column 14, line 23, delete "in the";
           line 64, "mulfunction" should be --malfunction--.

Column 15, line 60, "At" should be --at--.

Column 16, line 65, "cyle" should be --cycle--.
```

UNITED STATES PATENT AND TRADEMARK OFFICE
CERTIFICATE OF CORRECTION

PATENT NO. : 4,514,719

DATED : Apr. 30, 1985

INVENTOR(S) : YOSHIHARU SUZUKI et al

It is certified that error appears in the above-identified patent and that said Letters Patent is hereby corrected as shown below:

Column 17, line 3, "tramsmitted" should be --transmitted--.

Signed and Sealed this

Twenty-fourth Day of September 1985

[SEAL]

Attest:

Attesting Officer

DONALD J. QUIGG

Commissioner of Patents and Trademarks—Designate